United States Patent
Kumamoto et al.

(10) Patent No.: US 12,496,671 B2
(45) Date of Patent: Dec. 16, 2025

(54) CONTROL DEVICE FOR MACHINE TOOL

(71) Applicant: FANUC CORPORATION, Yamanashi (JP)

(72) Inventors: Yuuki Kumamoto, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 265 days.

(21) Appl. No.: 18/557,793

(22) PCT Filed: May 26, 2021

(86) PCT No.: PCT/JP2021/019957
§ 371 (c)(1),
(2) Date: Oct. 27, 2023

(87) PCT Pub. No.: WO2022/249317
PCT Pub. Date: Dec. 1, 2022

(65) Prior Publication Data
US 2024/0217047 A1  Jul. 4, 2024

(51) Int. Cl.
B23Q 15/007  (2006.01)
G05B 19/4093  (2006.01)

(52) U.S. Cl.
CPC ..... B23Q 15/0075 (2013.01); G05B 19/4093 (2013.01); *G05B 2219/49055* (2013.01)

(58) Field of Classification Search
CPC ...... B23Q 13/08; B23Q 15/013; B23Q 15/12; B23Q 15/14; G05B 13/0265; G05B 19/182; G05B 19/404; G05B 19/4147
See application file for complete search history.

(56) References Cited

U.S. PATENT DOCUMENTS

2009/0107308 A1  4/2009  Woody et al.
2019/0064764 A1*  2/2019  Watanabe .............. G05B 19/19

FOREIGN PATENT DOCUMENTS

| CN | 108788182 A | 11/2018 |
|---|---|---|
| JP | 2014-054688 A | 3/2014 |
| JP | 5606658 B1 | 10/2014 |

(Continued)

OTHER PUBLICATIONS

International Search Report issued in PCT/JP2021/019957; mailed Aug. 3, 2021.

*Primary Examiner* — Said Bouziane
(74) *Attorney, Agent, or Firm* — Studebaker Brackett PLLC

(57) ABSTRACT

Provided is a control device for a machine tool that can suitably shred chips in a state without good conformability. A control device for a machine tool which oscillates a tool and a workpiece relative to each other while machining comprises: a comparison unit that compares the oscillation amplitude calculated value calculated by an oscillation amplitude calculation unit and the oscillation amplitude minimum value set by a minimum value setting unit; an oscillation command generation unit that generates an oscillation command on the basis of the oscillation condition and the value of the oscillation amplitude obtained from the comparison results of the comparison unit; and a position/speed control unit that oscillates the workpiece and the tool relative to each other on the basis of a superimposition command obtained by superimposing the oscillation command over a position command.

7 Claims, 2 Drawing Sheets

(56) References Cited

FOREIGN PATENT DOCUMENTS

| JP | 2018-180633 A | 11/2018 |
| JP | 2019-040252 A | 3/2019 |
| JP | 2021-003802 A | 1/2021 |

\* cited by examiner

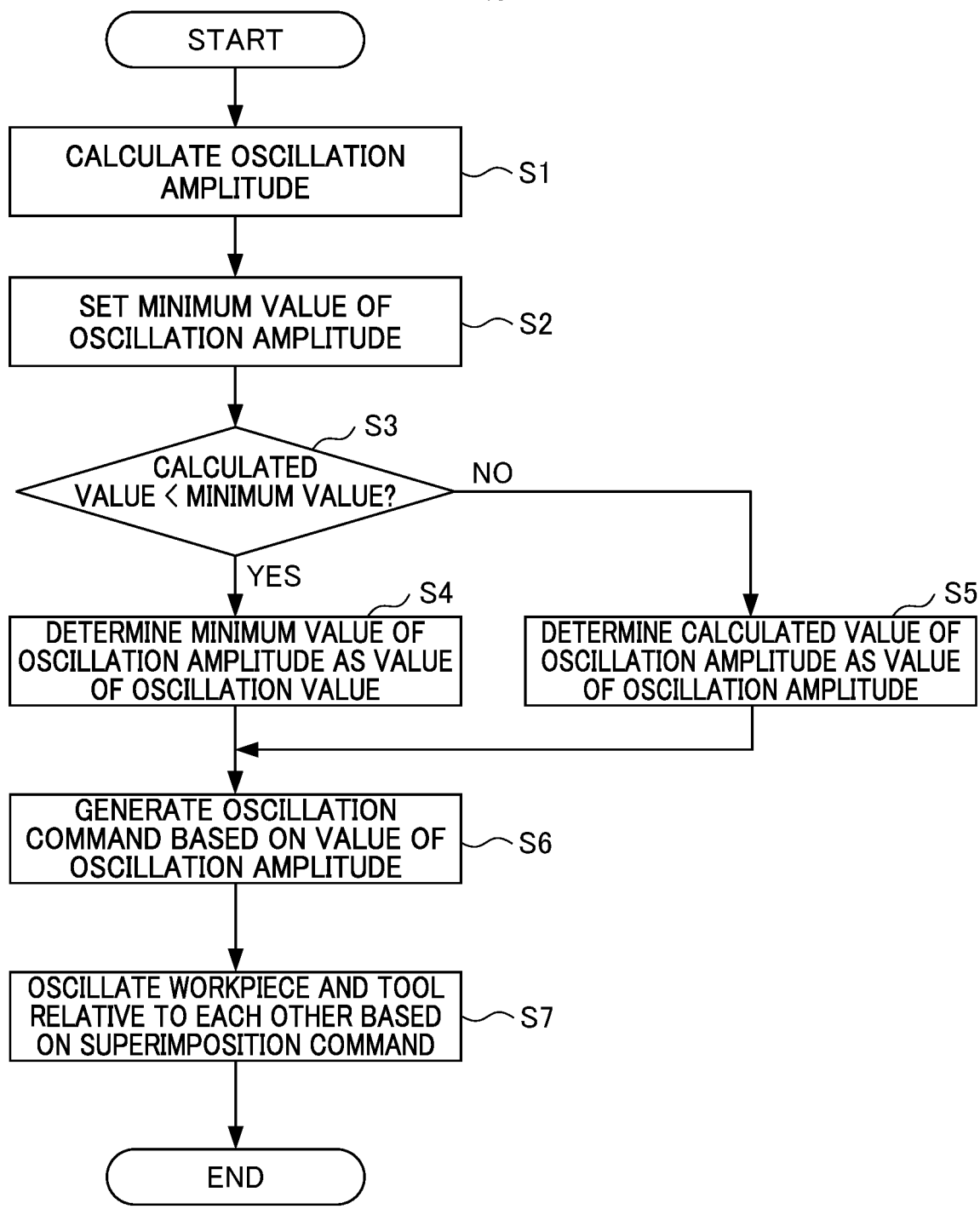

CONTROL DEVICE FOR MACHINE TOOL

TECHNICAL FIELD

The present invention relates to a control device for a machine tool.

BACKGROUND ART

Conventionally, oscillation cutting is often applied as a measure against chips generated during drilling, turning, etc. Conventional numerical control realizes oscillation cutting by superimposing an oscillation command on a position command.

Immediately after the oscillation command is applied or immediately after the feed speed is changed, a state that cannot track the change in a command exists temporarily. In this state, the oscillation amplitude required to shred chips may not be obtained in the actual position of the tool. In this case, there is a problem in that chips cannot be appropriately shredded. In order to continue shredding chips, a technique has been proposed in which frequency or amplitude is compensated so that tool paths overlap even if a tracking error occurs (for example, see Patent Document 1).

Patent Document 1: Japanese Unexamined Patent Application, Publication No. 2019-40252

DISCLOSURE OF THE INVENTION

Problems to be Solved by the Invention

However, the oscillation amplitude is determined by multiplying the command by the oscillation amplitude multiplying factor according to the feed speed. Therefore, when the oscillation amplitude multiplying factor is increased in advance in consideration of the delay in tracking the command, the oscillation amplitude becomes excessive in the steady state, the tools are affected and, the surface roughness, etc., are also affected. Therefore, it is desirable to appropriately shred chips in a state in which the tracking is not good, such as immediately after the start of machining or immediately before the end of machining.

Means for Solving the Problems

A control device for a machine tool that performs machining while oscillating a tool and a workpiece relative to each other, according to an aspect of the present disclosure is directed to a control device including: an oscillation amplitude calculation unit that calculates an oscillation amplitude based on an oscillation condition for oscillating the workpiece and the tool relative to each other and a feed speed of the tool; a minimum value setting unit that sets a minimum value of the oscillation amplitude; a comparison unit that compares a calculated value of the oscillation amplitude calculated by the oscillation amplitude calculation unit with the minimum value of the oscillation amplitude set by the minimum value setting unit; an oscillation command generation unit that generates an oscillation command based on a value of the oscillation amplitude obtained from a comparison result by the comparison unit, and the oscillation condition; and a position-speed control unit that oscillates the workpiece and the tool relative to each other based on a superimposition command obtained by superimposing the oscillation command on a position command.

Effects of the Invention

According to the present invention, it is possible to provide a control device for a machine tool capable of appropriately shredding chips in a state in which tracking is not good.

BRIEF DESCRIPTION OF THE DRAWINGS

FIG. 2 is a flowchart showing processing of the control device according to the present embodiment.

PREFERRED MODE FOR CARRYING OUT THE INVENTION

Figure 1:
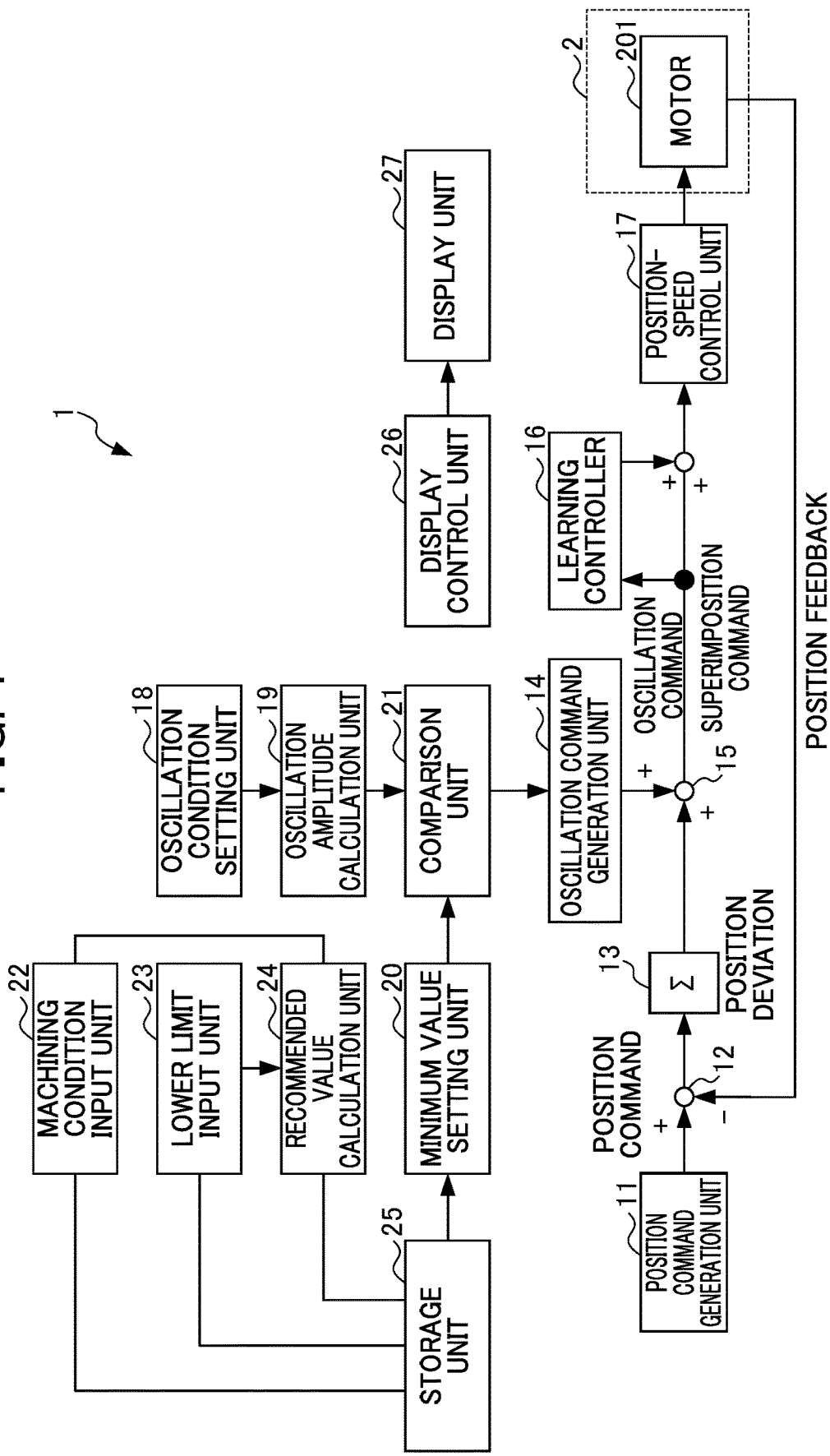
FIG. 1 is a block diagram showing a configuration of a control device according to the present embodiment.

Hereinafter, an example of an embodiment of the present invention will be described. FIG. 1 is a block diagram showing a configuration of a control device 1 for a machine tool according to the present embodiment. The control device 1 controls a machine tool 2 that performs machining while oscillating a tool and a workpiece relative to each other. The control device 1 oscillates the tool with respect to the workpiece so that finely broken chips are generated in order to reduce or prevent chips generated by cutting from being entangled with the workpiece or the tool.

The control device 1 may be connected to a higher-order computer (not shown) such as CNC (Computer Numerical Controller) and PLC (Programmable Logic Controller).

As shown in FIG. 1, the control device 1 includes a position command generation unit 11, a first adder 12, an integrator 13, an oscillation command generation unit 14, a second adder 15, a learning controller 16, a position-speed control unit 17, an oscillation condition setting unit 18, an oscillation amplitude calculation unit 19, a minimum value setting unit 20, a comparison unit 21, a machining condition input unit 22, a lower limit value input unit 23, a recommended value calculation unit 24, a storage unit 25, a display control unit 26, and a display unit 27.

The position command generation unit 11 generates a position command for a motor 201 of the machine tool 2 based on machining conditions for machining a workpiece by the tool. Here, the machining conditions may be outputted from a higher-order computer such as a CNC or PLC to the position command generation unit 11. As shown in FIG. 1, the generated position command is inputted to the first adder 12.

The first adder 12 calculates a position deviation. Specifically, the first adder 12 calculates a position deviation that is the difference between a position feedback and a position command based on the position detection of the feed shaft by the encoder of the motor 201.

The integrator 13 calculates an integrated value of the position deviation. Specifically, the integrator 13 calculates an integrated value of the position deviation by integrating the position deviation calculated by the first adder 12.

The oscillation command generation unit 14 generates an oscillation command. Specifically, the oscillation command generation unit 14 generates an oscillation command based on the value of the oscillation amplitude obtained from the comparison result by the comparison unit 21 and the oscillation conditions. The oscillation command generation unit 14 may obtain the oscillation command from the oscillation conditions including the oscillation amplitude multiplying factor and the oscillation frequency multiplying factor and the machining conditions, or may obtain the oscillation command from the oscillation condition including the oscillation amplitude and the oscillation frequency.

The learning controller 16 calculates a compensation amount of the superimposition command based on the superimposition command, and adds the compensation amount to the superimposition command by the adder, thereby compensating the superimposition command. The learning controller 16 has memory, and stores the oscillation phase and the superimposition command in relation to each other in one or a plurality of cycles of oscillation. The learning controller 16 reads the superimposition command stored in the memory at a timing at which the phase delay of the oscillation operation according to the responsiveness of the motor 201 can be compensated, and outputs the superimposition command to the adder as a compensation amount.

The position-speed control unit 17 generates a torque command for the motor 201 for driving the feed shaft based on the superimposition command after the addition of the compensation amount, and controls the motor 201 based on the generated torque command. With such a configuration, it is possible for the machine tool 2 to perform machining while oscillating the tool and the workpiece relative to each other.

The oscillation condition setting unit 18 sets an oscillation conditions for oscillating the workpiece and the tool relative to each other. Specifically, the oscillation condition setting unit 18 sets the oscillation amplitude or oscillation amplitude multiplying factor, and the oscillation frequency or oscillation frequency multiplying factor. The oscillation conditions including the oscillation amplitude or oscillation amplitude multiplying factor, and the oscillation frequency or oscillation frequency multiplying factor are inputted to the oscillation amplitude calculation unit 19.

The oscillation amplitude calculating unit 19 calculates the oscillation amplitude based on the feed speed of the tool and the oscillation condition set by the oscillation condition setting unit 18.

The minimum value setting unit 20 sets the minimum value of the oscillation amplitude. Specifically, the minimum value setting unit 20 sets the minimum value of the oscillation amplitude based on the parameters of the CNC, designation by the machining program, and the like.

The minimum value setting unit 20 may change the minimum value of the oscillation amplitude according to the machining conditions. Here, the machining conditions include the rotation speed of the workpiece, the feed speed of the tool, the command acceleration, the inertia, the cutting load, the mechanical rigidity, and the like. However, in particular, machining conditions preferably include the command acceleration, the inertia, the cutting load, or the mechanical rigidity.

For example, when the command acceleration, the inertia, the cutting load, or the mechanical rigidity changes, the minimum value setting unit 20 changes the minimum value of the oscillation amplitude by multiplying the minimum value of the oscillation amplitude in the state before the change by a multiplying factor (override value). The minimum value setting unit 20 similarly multiplies the minimum value of the oscillation amplitude in the state before the change by the multiplying factor (override value) even when the time period or distance from the start of the oscillation to the machining point changes. With such a configuration, since the time period from the start of the oscillation to the machining point is prolonged, it is possible for the controller 1 to reduce the delay in tracking. The cause of the change of the cutting load is, for example, a change in specifications of the workpiece and the tool.

The minimum value setting unit 20 may select the minimum value of the oscillation amplitude stored in the storage unit 25 according to the machining conditions. For example, when a plurality of machining conditions are stored in the storage unit 25, preset values may be provided for the machining conditions. For example, when the machining condition is the cutting load and it is difficult to estimate the cutting load, the machining condition may be a result of actual machining or air cutting stored in the storage unit 25.

The comparison unit 21 compares the calculated value of the oscillation amplitude calculated by the oscillation amplitude calculation unit 19 with the minimum value of the oscillation amplitude set by the minimum value setting unit 20. Specifically, the comparison unit 21 determines whether or not the calculated value of the oscillation amplitude calculated by the oscillation amplitude calculation unit 19 is less than the minimum value of the oscillation amplitude set by the minimum value setting unit 20.

When the calculated value of the oscillation amplitude is less than the minimum value of the oscillation amplitude, the comparison unit 21 determines the minimum value of the oscillation amplitude as the value of the oscillation amplitude. When the calculated value of the oscillation amplitude is equal to or greater than the minimum value of the oscillation amplitude, the comparison unit 21 determines the calculated value of the oscillation amplitude as the value of the oscillation amplitude.

The machining condition input unit 22 receives an input of machining conditions by, for example, an input operation by a user. The machining condition input unit 22 outputs the inputted machining condition to the recommended value calculation unit 24 and the storage unit 25.

The lower limit value input unit 23 receives, for example, an input of a minimum value of the oscillation amplitude by an input operation by a user. The lower limit value input unit 23 outputs the inputted oscillation amplitude to the recommended value calculation unit 24 and the storage unit 25.

The recommended value calculation unit 24 estimates the minimum value of the oscillation amplitude corresponding to the inputted machining condition newly inputted by the machining condition input unit 22 or the lower limit value input unit 23 based on the plurality of machining conditions stored in the storage unit 25. In this case, the storage unit 25 stores a plurality of minimum values of the oscillation amplitude to be associated with the machining conditions. With such a configuration, it is possible for the recommended value calculating unit 24 to calculate a more accurate estimated value based on the plurality of data (i.e., the minimum value of the oscillation amplitude and the machining conditions) stored in the storage unit 25.

The display control unit 26 causes the display unit 27 to display setting information including the minimum value of the oscillation amplitude and the machining condition. The display unit 27 is configured by a liquid crystal display (LCD), a cathode ray tube (CRT), or the like, and displays various images under the control of the display control unit 26.

When the setting information is displayed on the display unit 27, the minimum value setting unit 20 may select and set a desired setting value using the setting information displayed on the display unit 27. For example, the minimum value setting unit 20 may receive an input or selection from the user with respect to the setting information displayed on the display unit 27, and set a desired setting value according to the input or selection from the user.

FIG. 2 is a flowchart showing processing of the control device 1 according to the present embodiment. In Step S1, the oscillation amplitude calculation unit 19 calculates the oscillation amplitude based on the oscillation conditions for oscillating the workpiece and the tool relative to each other. In Step S2, the minimum value setting unit 20 sets the minimum value of the oscillation amplitude.

In Step S3, the comparison unit 21 compares the calculated value of the oscillation amplitude calculated by the oscillation amplitude calculation unit 19 with the minimum value of the oscillation amplitude set by the minimum value setting unit 20. Specifically, the comparison unit 21 determines whether or not the calculated value of the oscillation amplitude calculated by the oscillation amplitude calculation unit 19 is less than the minimum value of the oscillation amplitude set by the minimum value setting unit 20. When the calculated value of the oscillation amplitude is less than the minimum value of the oscillation amplitude (YES), the processing advances to Step S4. When the calculated value of the oscillation amplitude is equal to or greater than the minimum value of the oscillation amplitude (NO), the processing advances to Step S5.

In Step S4, the comparison unit 21 determines the minimum value of the oscillation amplitude as the value of the oscillation amplitude. In Step S5, the comparison unit 21 determines the calculated value of the oscillation amplitude as the value of the oscillation amplitude.

In Step S6, the oscillation command generation unit 14 generates an oscillation command based on the value of the oscillation amplitude obtained from the comparison result by the comparison unit 21 and the oscillation conditions.

Specifically, the oscillation command generation unit 14 generates an oscillation command based on the value of the oscillation amplitude determined in Step S4 or Step S5 and the oscillation condition.

In Step S7, the learning controller 16 calculates a compensation amount of the superimposition command based on the superimposition command, and adds the calculated compensation amount to the superimposition command by the adder, thereby compensating the superimposition command.

Thereafter, the position-speed control unit 17 generates a torque command for the motor 201 for driving the feed shaft based on the superimposition command after the addition of the compensation amount, and controls the motor 201 by the generated torque command.

According to the present embodiment, the control device 1 includes: the oscillation amplitude calculation unit 19 that calculates an oscillation amplitude based on an oscillation condition for oscillating the workpiece and the tool relative to each other and a feed speed of the tool; the minimum value setting unit 20 that sets a minimum value of the oscillation amplitude; the comparison unit 21 that compares a calculated value of the oscillation amplitude calculated by the oscillation amplitude calculation unit 19 with the minimum value of the oscillation amplitude set by the minimum value setting unit 20; the oscillation command generation unit 14 that generates an oscillation command based on a value of the oscillation amplitude obtained from a comparison result by the comparison unit 21, and the oscillation condition; and the position-speed control unit 17 that oscillates the workpiece and the tool relative to each other based on a superimposition command obtained by superimposing the oscillation command on a position command.

With such a configuration, it is possible for the control device 1 to provide the lower limit value of the oscillation amplitude, whereby it is possible to shred the chips appropriately in a state in which the tracking is not good, such as immediately after the start of machining or immediately before the end of machining.

Furthermore, the minimum value setting unit 20 changes the minimum value of the oscillation amplitude according to machining conditions for machining the workpiece with the tool. With such a configuration, it is possible for the control device 1 to employ an appropriate minimum value of the oscillation amplitude according to the machining conditions.

Furthermore, the control device 1 further includes the storage unit 25 that stores a plurality of minimum values of the oscillation amplitude to be associated with the machining conditions, and the minimum value setting unit 20 selects the minimum value of the oscillation amplitude stored in the storage unit 25 according to the machining conditions. With such a configuration, it is possible for the control device 1 to select an appropriate minimum value of the oscillation amplitude according to the plurality of machining conditions.

Furthermore, the control device 1 further includes the recommended value calculation unit 24 that estimates the minimum value of the oscillation amplitude corresponding to an inputted machining condition newly inputted based on the machining conditions stored in the storage unit 25. With such a configuration, it is possible for the control device 1 to calculate the estimated value with higher accuracy based on the plurality of data sets (i.e., the minimum value of the oscillation amplitude and the machining condition) stored in the storage unit 25.

Furthermore, the control device 1 further includes the display control unit 26 that displays setting information including the minimum value of the oscillation amplitude and the machining condition on the display unit 27. With such a configuration, for example, it is possible for the operator operating the control device 1 to view and check the setting information.

Furthermore, the minimum value setting unit 20 selects and sets a desired setting value using the setting information displayed on the display unit 27. With such a configuration, for example, an operator operating the control device 1 can set an appropriate minimum value of the oscillation amplitude by viewing and checking the setting information.

Furthermore, the control device 1 includes the learning controller 16 that calculates a compensation amount of the superimposition command based on the superimposition command and adds the calculated compensation amount to the superimposition command, thereby compensating the superimposition command. In general, since the deviation (superimposition command) with respect to the oscillation command becomes larger as the oscillation frequency becomes higher, it is possible to improve the tracking with respect to the periodic oscillation command by the compensation by the learning controller 16. With such a configuration, it is possible for the control device 1 to improve the tracking to the superimposition command, and to easily realize a desired chip length while suppressing deterioration of the machining accuracy.

Although an embodiment of the present invention has been described above, the control device 1 described above can be implemented by hardware, software, or a combination thereof. The control method performed by the control device 1 can also be implemented by hardware, software, or a combination thereof. Here, "implemented by software" indicates that it is realized by a computer reading and executing a program.

The programs may be stored using various types of non-transitory computer-readable media (non-transitory computer readable medium), and provided to a computer. Non-transitory computer-readable media includes various types of tangible storage media. Examples of non-transitory computer-readable media include magnetic recording media (e.g., hard disk drives), magneto-optical recording media (e.g., magneto-optical disks), CD-ROM (Read Only Memory), CD-R, CD-R/W, semiconductor memory (for example, mask ROM, PROM (programmable ROM), EPROM (erasable PROM), flash ROM, and RAM (random access memory)).

Although the above-described embodiment is a preferred embodiment of the present invention, the scope of the present invention is not limited to the above-described embodiment, and various modifications can be made without departing from the gist of the present invention.

EXPLANATION OF REFERENCE NUMERALS 1 control device
2 machine tool
11 position command generation unit
12 first adder
13 integrator
14 oscillation command generation unit
15 second adder
16 learning controller
17 position-speed control unit
18 oscillation condition setting unit
19 oscillation amplitude calculation unit
20 minimum value setting unit
21 comparison unit
22 machining condition input unit

The invention claimed is:

1. A control device for a machine tool that performs machining while oscillating a tool and a workpiece relative to each other, the control device comprising:
   an oscillation amplitude calculation unit that calculates an oscillation amplitude based on an oscillation condition for oscillating the workpiece and the tool relative to each other and a feed speed of the tool;
   a minimum value setting unit that sets a minimum value of the oscillation amplitude;
   a comparison unit that compares a calculated value of the oscillation amplitude calculated by the oscillation amplitude calculation unit with the minimum value of the oscillation amplitude set by the minimum value setting unit;
   an oscillation command generation unit that generates an oscillation command based on a value of the oscillation amplitude obtained from a comparison result by the comparison unit, and the oscillation condition; and
   a position-speed control unit that oscillates the workpiece and the tool relative to each other based on a superimposition command obtained by superimposing the oscillation command on a position command.

2. The control device according to claim 1, wherein the minimum value setting unit changes the minimum value of the oscillation amplitude according to a machining condition for machining the workpiece with the tool.

3. The control device according to claim 2, further comprising a storage unit that stores a plurality of minimum values of the oscillation amplitude to be associated with the machining condition, wherein the minimum value setting unit selects the minimum value of the oscillation amplitude stored in the storage unit according to the machining condition.

4. The control device according to claim 3, further comprising a recommended value calculation unit that estimates the minimum value of the oscillation amplitude corresponding to an inputted machining condition newly inputted based on the machining condition stored in the storage unit.

5. The control device according to claim 2, further comprising a display control unit that displays setting information including the minimum value of the oscillation amplitude and the machining condition on a display unit.

6. The control device according to claim 5, wherein the minimum value setting unit selects and sets a desired setting value using the setting information.

7. The control device according to claim 1, further comprising a learning controller that calculates a compensation amount of the superimposition command based on the superimposition command, and adds the calculated compensation amount to the superimposition command, thereby compensating the superimposition command.

* * * * *